United States Patent [19]
Greenaway et al.

[11] Patent Number: 6,027,180
[45] Date of Patent: Feb. 22, 2000

[54] MANUAL EMPTY/LOAD DEVICE

[75] Inventors: William G. Greenaway, N. Huntingdon; James M. Zemyan, Wilmerding; Roger V. Lewis, N. Huntingdon, all of Pa.

[73] Assignee: Westinghouse Air Brake Company, Wilmerding, Pa.

[21] Appl. No.: 09/301,038

[22] Filed: Apr. 28, 1999

[51] Int. Cl.$^7$ ..................................................... B60T 8/18
[52] U.S. Cl. ........................ 303/22.2; 188/195; 303/22.3
[58] Field of Search ................. 303/22.2, 22.3, 303/22.8, 22.7, 22.1; 188/195

[56] References Cited

U.S. PATENT DOCUMENTS

| | | | |
|---|---|---|---|
| 4,441,763 | 4/1984 | Fauck et al. | 303/22.2 |
| 4,552,410 | 11/1985 | Wickham et al. | 303/22.2 |
| 4,824,179 | 4/1989 | Rees | 303/22.2 |
| 5,106,168 | 4/1992 | McKay | 303/22.2 |
| 5,269,595 | 12/1993 | McKay et al. | 303/22.2 |
| 5,303,987 | 4/1994 | McKay | 303/22.2 |

*Primary Examiner*—Douglas C. Butler
*Attorney, Agent, or Firm*—James Ray & Associates

[57] ABSTRACT

A manual shifting apparatus for an automatic empty/load brake device used in conjunction with a pneumatic braking system provided on a transport vehicle having a truck and a car body mounted thereon through a resilient suspension system. The automatic empty/load brake device has a sensor arm which moves through a range of positions upon the application of a braking force to the transport vehicle by the pneumatic braking system. The range of positions includes a first range of positions indicating the transport vehicle as being in a loaded condition and a second range of positions indicating the transport vehicle as being in an unloaded condition. The automatic empty/load brake device applies a substantially reduced pneumatic braking force to the transport vehicle whenever the sensor arm is in the second range of positions. The manual shifting apparatus is adapted for mounting on the transport vehicle adjacent the automatic empty/load brake device and includes a manual shifting member movable between a first disposition and a second disposition. In the first disposition, the manual shifting member confines the sensor arm of the automatic empty/load device to the first range of positions and excludes the sensor arm from travel into the second range of positions. In the second disposition, the manual shifting member permits the sensor arm of the automatic empty/load device to travel into the second range of positions.

20 Claims, 5 Drawing Sheets

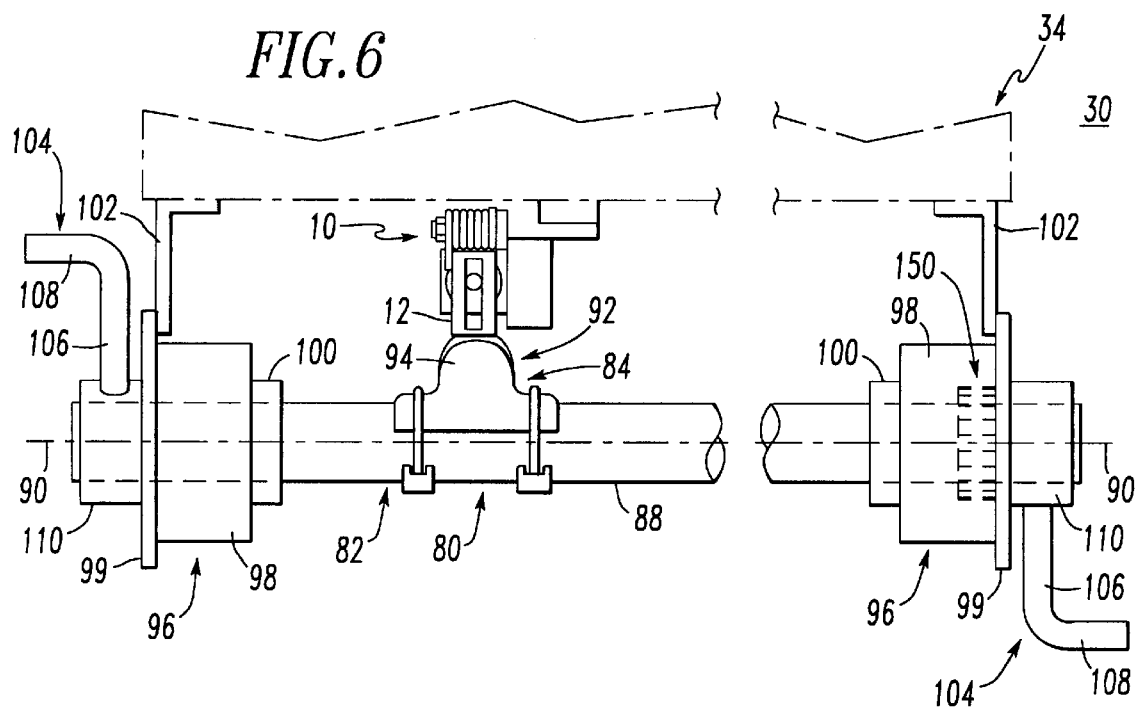
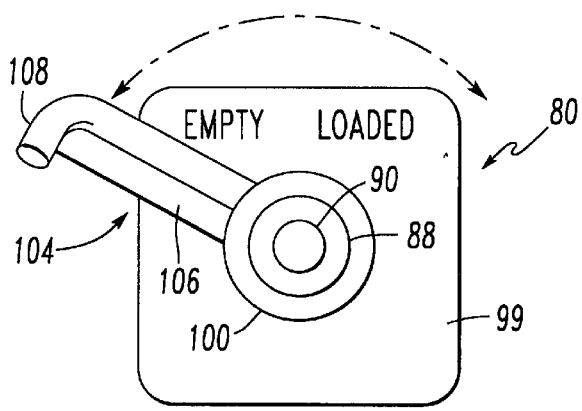
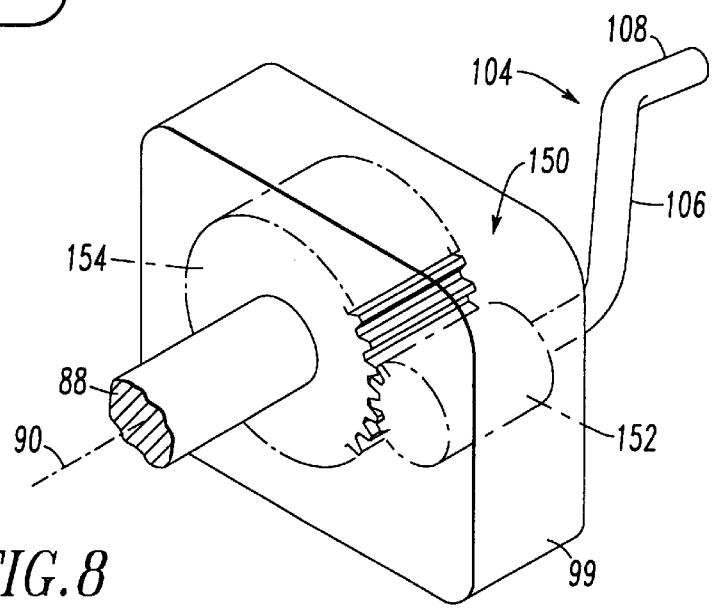

MANUAL EMPTY/LOAD DEVICE

FIELD OF THE INVENTION

The present invention relates, in general, to pneumatic braking systems and, more particularly, the present invention relates to empty/load brake equipment frequently employed on "rolling stock", that is, wheeled vehicles of a railway or motor carrier.

BACKGROUND OF THE INVENTION

Pneumatic braking systems employing compressed air are well known, particularly, in the rail transportation industry, e.g., freight and passenger trains. Pneumatic braking systems are also employed in many road transport vehicles, such as heavy trucks.

Typically, in a train, a so-called "brake pipe" carrying compressed air runs from railcar to railcar for the length of the train. Such a "brake pipe" is made up of a series of individual compressed air lines running the length of each railcar which are coupled end to end during the formation of the train. During a braking operation, the braking force that is applied to the wheels of each of the railcars is typically dependent upon the pressure in the brake pipe. This pressure is controlled by the engineer or other operator.

The weight of a railcar (or any rolling stock for that matter) can vary significantly depending upon whether or not it is loaded. For example, a modern lightweight aluminum hopper railcar can weigh as little as 44,000 lbs. yet have a gross loaded weight of up to 286,000 lbs., meaning a "gross to tare ratio" of about 6.5 to 1. It is well known in the rail transportation industry that, if a train is made up of both loaded and empty railcars, then a high braking force which would be appropriate for the loaded railcars will tend to cause the wheels of the empty cars to slide (i.e., skid). Such wheel sliding on empty railcars can be significantly reduced by lowering the braking force applied by the pneumatic braking system to the empty railcars. To this end, so-called "empty/load" brake equipment has been developed and is well understood by those of ordinary skill in the pneumatic brake field.

Normally, a railcar will include a wheeled "truck" portion, which contacts the track, and a "railcar body" portion, which is mounted on the truck by a resilient suspension system, e.g., springs. In an empty condition, the railcar body rides relatively high above the truck. When the railcar is loaded, the suspension is compressed and the railcar body moves closer to the truck. One well known type of widely used empty/load brake device utilizes this phenomenon to operate substantially "automatically" by employing a sensor arm which extends to determine the truck to railcar body clearance and which then reduces the braking force if the sensor arm is able to extend beyond a determined point due to a relatively large truck to railcar body clearance indicating the associated railcar as being in a substantially empty condition.

Such automatic empty/load brake devices include the well known units manufactured by Westinghouse Air Brake Company (also referred to herein as "WABCO") under the designations "SC1" and "ELX". The term "SC1/ELX-Type" brake devices (or equipment or units) is used herein to refer collectively to the SC1 and ELX units manufactured by Westinghouse Air Brake Company, as well as to other automatic empty/load brake devices which function in a similar manner to reduce braking force dependent upon the movement of a sensor arm (or sensor member).

SC1/ELX-Type automatic empty/load brake devices can be mounted on either the truck or the railcar body. Most typically, however, they are mounted on the railcar body. When the brakes are applied, the sensor arm moves toward the other of the truck and the railcar body. The distance which the sensor arm is able to traverse unimpeded is a measure of the truck to railcar body clearance and, hence, the loaded or unloaded condition of the railcar.

If the sensor arm is able to traverse past a particular "transition position", the railcar is determined to be in an unloaded (or empty) condition. The automatic empty/load brake device then operates to reduce the pressure supplied to the brake cylinders (and therefore the braking force) for the associated railcars. In so-called "dual capacity" empty/load brake equipment, the reduction (or proportioning) of the brake cylinder pressure for a railcar determined to be empty is a set proportion of the full unreduced brake cylinder pressure for a loaded railcar. Typically, the brake cylinder pressure for a railcar determined to be empty is in the range of either 50% or 60% of the normal brake cylinder pressure for a loaded railcar. However, one of the aforementioned ELX units proportions the unloaded brake cylinder pressure at 40%.

Conversely, if the sensor arm is not able to move past the transition position due to its contacting the other of the truck and the railcar body, the railcar is then determined to be loaded. The automatic empty/load brake device then operates to apply the full brake cylinder pressure as determined by the brake pipe pressure.

It will be understood, therefore, that the "automatic" functioning of such an automatic empty/load brake device is dependent upon a proper sensing of the truck to railcar body clearance.

However, the total possible truck to railcar body clearance (or "available spring travel") can vary depending upon the national standards of the particular country in which the equipment is being operated. In this regard, while the particular SC1/ELX-Type automatic empty/load brake devices manufactured by Westinghouse Air Brake Company referred to above are designed to function properly with standard U.S. rolling stock, it has been found that such SC1/ELX-Type brake equipment may not function as well as could be desired in a number of non-U.S. countries where the available spring travel may be significantly less than that adopted as standard for U.S. rolling stock. Possible examples of such countries include, but are not limited to, Egypt, Turkey, England, certain European regions and other UIC-type territories.

Additionally, there are a number of countries and regions which have adopted so-called "manual" empty/load brake devices as a standard. In a manual empty/load brake device, the loaded or empty condition of the railcar is not sensed automatically. Instead, such manual devices require the operating personnel to manually shift the braking adjustment device for each railcar or group of associated railcars.

Therefore, at present, SC1/ELX-Type brake equipment may be underutilized, either in countries where the adopted standard provides for too little available spring travel or in countries is having a standard which requires a manual shifting of empty/load braking devices.

Currently, the various SC1/ELX-Type automatic empty/load brake equipment units manufactured by Westinghouse Air Brake Company which employ such a sensor arm to determine the loaded or unloaded condition of railcars include an ELX-U unit, an ELX-B unit and an SC1 unit. In the ELX-U unit, a sensor unit, a proportioning unit and an air equalizing reservoir are all provided as an integral one-piece assembly. In the ELX-B unit, a sensor unit and a proportioning unit are combined integrally, while an equalizing reservoir is separately mounted. Finally, in the older style SC1 unit, a sensor unit, a proportioning unit and an equalizing reservoir are all mounted separately from one another.

OBJECTS OF THE INVENTION

Accordingly, one object of the present invention is the provision of a manual shifting apparatus for manually shifting an automatic empty/load brake device of the SC1/ELX-Type or another similar such device.

Another object of the present invention is the provision of a manual shifting apparatus which can be used in combination with SC1/ELX-Type automatic empty/load brake equipment (or similar such equipment) to adapt it for use in countries or regions which have adopted a reduced truck to railcar body clearance as compared to the U.S. standard.

A further object of the present invention is the provision of a manual shifting apparatus which can be used in combination with SC1/ELX-Type automatic empty/load brake equipment (or similar such equipment) to adapt it for use in countries or regions which have adopted a standard that calls for manual shifting of empty/load brake devices.

A still further object of the present invention is the provision of such a manual shifting apparatus which may be inexpensive to manufacture and highly reliable in operation.

In addition to the objects and advantages of the present invention described above, various other objects and advantages of the invention will become more readily apparent to those persons skilled in the relevant arts from the following more detailed description of the invention, particularly, when such description is taken in conjunction with the attached drawing figures and with the appended claims.

SUMMARY OF THE INVENTION

In one aspect, the invention generally features a manual shifting apparatus for manually shifting an automatic empty/load brake device used in conjunction with a pneumatic braking system provided on a transport vehicle which has a truck and a car body mounted on the truck through a resilient suspension system. The transport vehicle has a loaded condition and an unloaded condition. The automatic empty/load brake device has a sensor arm operable to move through a range of positions upon the application of a braking force to the transport vehicle by the pneumatic braking system. The range of positions of the sensor arm includes a first range of positions indicating the transport vehicle as being in the loaded condition and a second range of positions indicating the transport vehicle as being in the unloaded condition. The automatic empty/load brake device operates to apply a substantially reduced pneumatic braking force to the transport vehicle when the sensor arm is in the second range of positions and to apply a substantially unreduced pneumatic braking force to the transport vehicle when the sensor arm is in the first range of positions. The manual shifting apparatus is adapted for mounting on the transport vehicle adjacent the automatic empty/load brake device and includes a manual shifting member movable between a first disposition and a second disposition, in the first disposition, the manual shifting member being operable to confine the sensor member of the automatic empty/load device to the first range of positions and to exclude the sensor member of the automatic empty/load device from travel into the second range of positions and, in the second disposition, the manual shifting member being operable to permit the sensor member of the automatic empty/load device to travel into the second range of positions.

In another aspect, the invention generally features a manual shifting apparatus for mounting on a wheeled vehicle having a pneumatic braking system for applying a pneumatic braking force thereto and utilizing an automatic empty/load brake device for determining an empty/loaded condition of the vehicle and for reducing the pneumatic braking force if the vehicle is determined to be empty. The automatic empty/load brake device is adapted for attachment to the vehicle and has a sensor member for determining the empty/loaded condition. The automatic empty/load brake device determines the vehicle to be loaded when the sensor member is in a first range of positions. The automatic empty/load brake device determines the vehicle to be empty when the sensor member is in the second range of positions. The first and second ranges of positions being divided by a transition position. The manual shifting apparatus includes a shaft member rotatable about an axis of rotation between a first disposition and a second disposition and an eccentric camming surface extending radially from the shaft member, the eccentric camming surface being eccentrically disposed with respect to the axis of rotation. In the first disposition, the eccentric camming surface physically protrudes into the second range of positions and at least up to the transition position of the automatic empty/load brake device. In the second disposition, the eccentric camming surface does not physically protrude up to the transition position of the automatic empty/load brake device.

The invention will now be described by way of a particularly preferred embodiment, reference being had to the accompanying drawings, wherein:

BRIEF DESCRIPTION OF THE DRAWINGS

FIG. 1 is a frontal view of a sensor unit of a "SC-1" empty/load brake device manufactured by Westinghouse Air Brake Company, one type of automatic empty/load brake device which the present invention is adapted for use in conjunction with.

FIG. 2 is a perspective view of a "ELX-U" automatic empty/load brake device also manufactured by Westinghouse Air Brake Company and also of a type which the present invention is adapted for use in conjunction with.

FIG. 3 is a frontal view of an ELX-B automatic empty/load brake device manufactured by Westinghouse Air Brake Company, which is yet another type of automatic empty/load brake device that the present invention is adapted for use in conjunction with. FIG. 3 also shows a side view of a manual empty/load shifting apparatus constructed according to the present invention positioned for manually shifting an SC1/ELX-Type automatic empty/load brake device between its loaded and unloaded operational characteristics.

FIG. 6 is an elevational end view of the inventive manual empty/load shifting apparatus positioned for shifting an SC-1/ELX-Type automatic empty/load brake device which is also shown.

FIG. 7 is an elevational side view of a handle portion of the inventive manual empty/load shifting apparatus.

FIG. 8 is a perspective interior view of a gear transfer reverser mechanism disposed between the handle portion shown in FIG. 7 and the manual empty/load shifting apparatus which is shown in FIG. 6.

DESCRIPTION OF THE PREFERRED EMBODIMENT

Figure 1:
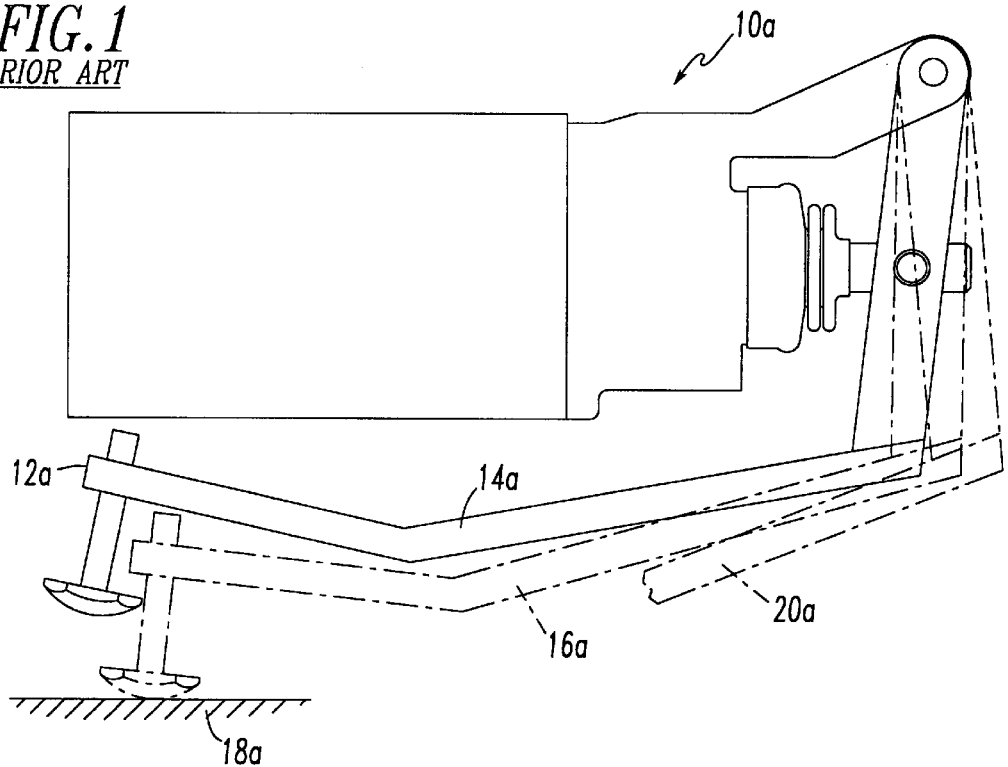

Prior to proceeding to a much more detailed description of the present invention, it should be noted that identical components which have identical functions have been identified with identical reference numerals throughout the several views illustrated in the drawing figures for the sake of clarity and understanding of the invention.

Reference is now directed to FIG. 1. Illustrated therein is a sensor unit of an SC1 automatic empty/load brake device manufactured by WABCO, generally designated 10a, for sensing whether a railcar (or other transport vehicle utilizing a pneumatic braking system) on which the automatic empty/load brake device 10a is mounted is in a substantially empty condition or a substantially loaded condition.

The automatic empty/load brake device 10a operates to reduce the braking of the associated railcar if it is determined to be in a substantially empty condition. The automatic brake device 10a is connected to a so-called "brake pipe" of a railway train (or other transport vehicle). As is well understood in the art, through the action of a so-called "AB-Type" Control Valve (sometimes also referred to as a "triple valve") which is positioned in each individual railcar, a reduction in the brake pipe pressure causes a rise in the brake cylinder pressure of each individual railcar, which in turn leads to an application of the brakes on each individual railcar.

The automatic empty/load brake device 10a includes a sensor arm 12a which determines the truck to railcar body clearance and hence whether the associated railcar is in a substantially loaded or substantially empty condition. Typically, the automatic empty/load brake device 10a is mounted on the associated railcar body such that the sensor arm 12a moves down toward the associated truck side frame when sufficient brake cylinder air pressure is applied from the AB-Type Control Valve. However, it is also possible (although not usually done) to mount the automatic empty/load brake device 10a on the truck in a position such that the sensor arm 12a moves upward toward the railcar body.

The operation of such an automatic empty/load brake device 10a is well understood by those of ordinary skill in the art of pneumatic braking and is discussed only briefly by way of background herein. During a braking application, as the brake pipe pressure falls and the brake cylinder pressure correspondingly increases, the sensor arm 12a moves outwardly from a "release" position 14a shown in solid lines in FIG. 1. A determination of whether the associated railcar is in a loaded or unloaded condition is made at a "transition" position shown approximately in phantom in FIG. 1 and designated by reference numeral 16a. If further outward movement of the sensor arm 12a is prevented by contact with a contact surface 18a (e.g., the truck side frame), the automatic empty/load brake device 10a functions to supply a full pressure to the brake cylinders as determined by the brake pipe pressure.

If, however, the sensor arm 12a is able to move past the transition position 16a, due to a sufficient clearance between the railcar body and the truck (indicative of a substantially empty railcar), then such automatic empty/load device 10a functions to reduce (or "proportion") the pressure supplied to the brake cylinders. A position of the sensor arm 12a beyond the transition point and corresponding to an empty condition is partially shown in phantom in FIG. 1 and indicated by reference numeral 20a. Typically, SC1/ELX-Type automatic empty/load brake devices are available which affect a reduction or proportioning of either 50% or 60%, depending on the unit chosen, of the brake cylinder pressure that would otherwise be applied to a loaded railcar.

Figure 2:
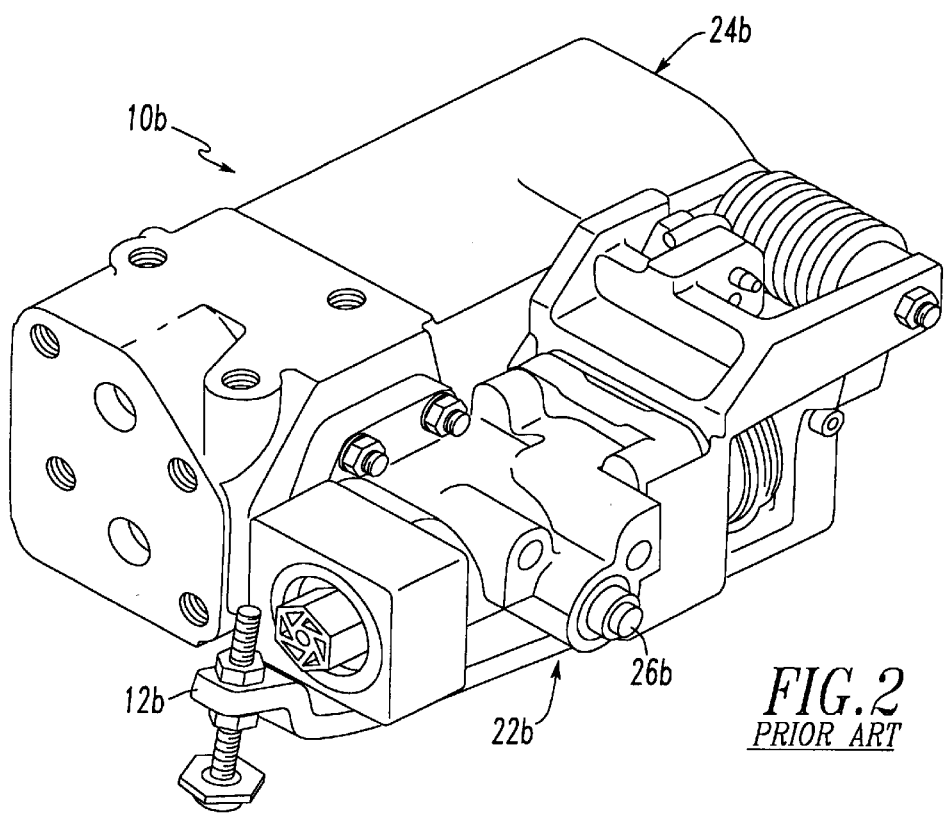

FIG. 2 shows an ELX-U automatic empty/load brake device generally designated by reference numeral 10b and also manufactured by Westinghouse Air Brake Company ("WABCO"). Whereas the SC-1 device shown in FIG. 1 is used in combination with a separately mounted proportional valve (not shown) for proportioning the brake cylinder pressure once an empty condition has been detected and a separately mounted equalizing reservoir (also not shown). The ELX-U device 10b shown in FIG. 2 combines a sensor unit, a proportioning unit and an equalizing reservoir unit within a single mountable package.

The ELX-U device 10b includes an extendable sensor arm 12b for determining railcar body to truck clearance, a combined sensor and proportioning unit 22b and an integrally provided equalizing reservoir 24b. Additionally, the ELX-U device 10b has an empty railcar indicator button 26b which protrudes to indicate when the ELX-U device 10b is sensing an empty railcar condition, i.e., when the sensor arm 12b is extended beyond the transition point during brake application.

Figure 3:
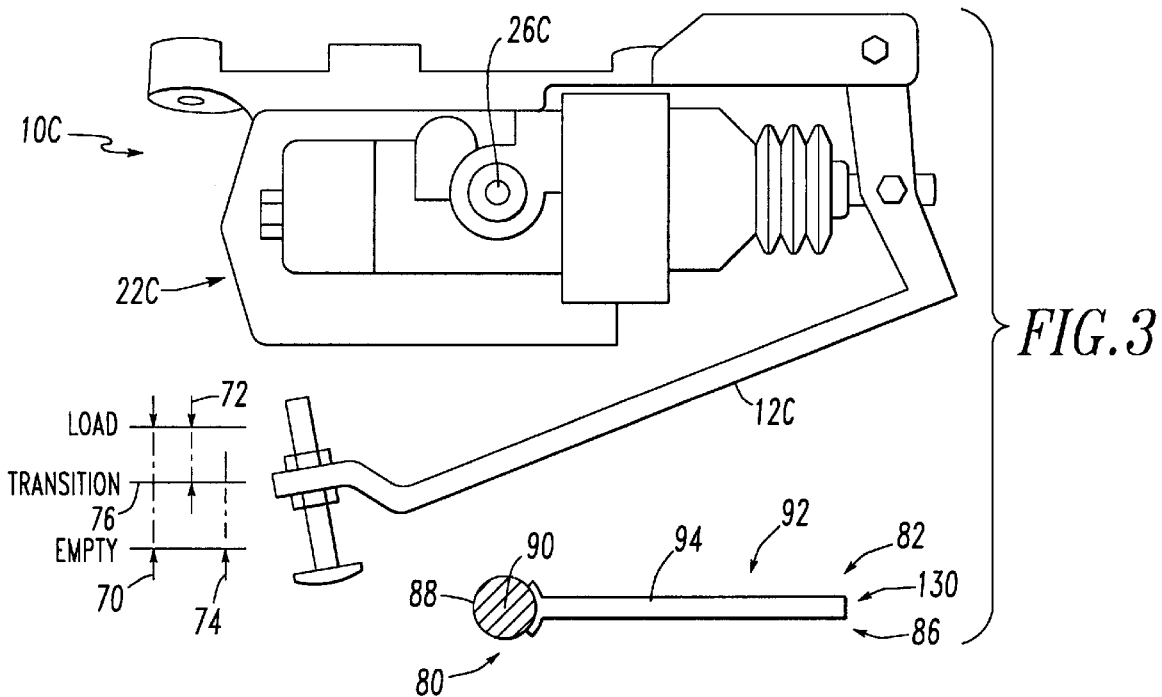

FIG. 3 illustrates an ELX-B type automatic empty/load brake device 10c also manufactured by WABCO. The ELX-B device 10c includes a sensor arm 12c and an integrally provided sensor and proportioning unit 22c. The ELX-B device 10c is used in combination with a separately mounted equalizing reservoir 24 (shown diagrammatically in FIG. 5). The ELX-B unit 10c also includes an empty railcar indicator button 26c.

A more precise description of the construction and functioning of the ELX-U and ELX-B units is to be found in U.S. Pat. No. 5,005,915 issued on Apr. 9, 1991 to Hart et al. and entitled "Empty/Load Changeover Valve for Railway Car" and in U.S. Pat. No. 5,100,207 issued on Mar. 31, 1992 to McKay and entitled "Empty/Load Changeover Valve with a Vent Passage Open in the Empty Setting", the teachings of each of these issued U.S. patents being hereby expressly incorporated herein by reference thereto.

The ELX-U and ELX-B units are additionally more fully described in a technical paper entitled "The E/L-X Empty-Load Equipment" presented by McKay, Albert A. at The Air Brake Association, Annual Technical Conference, Chicago, Ill., Sep. 22, 1992, this paper additionally being hereby expressly incorporated by reference herein.

Further description of the SC1 unit can be found in allowed U.S. patent application Ser. No. 08/901,096 filed on Jul. 28, 1997 to Scott et al. and entitled "Dual Seal Fitting for Enabling Quick Measurement of Brake Cylinder Pressure" and in allowed U.S. patent application Ser. No. 08/968,271 filed on Nov. 12, 1997 to Troiani et al. and entitled "Dual Valve Fitting for Enabling Quick Measurement of Pressure". Each of these allowed U.S. patent applications is hereby expressly incorporated by reference herein. Additional details of the construction and functioning of the SC1 unit are to be found in a promotional pamphlet entitled "WABCO's Low Cost Simple Reliable Automatic Proportional Empty & Load Freight Brake Equipment" published by Westinghouse Air Brake Company, 1001 Air Brake Avenue, Wilmerding, Pa. 15148 in April, 1993, this publication being hereby expressly incorporated by reference herein.

Figure 4A:
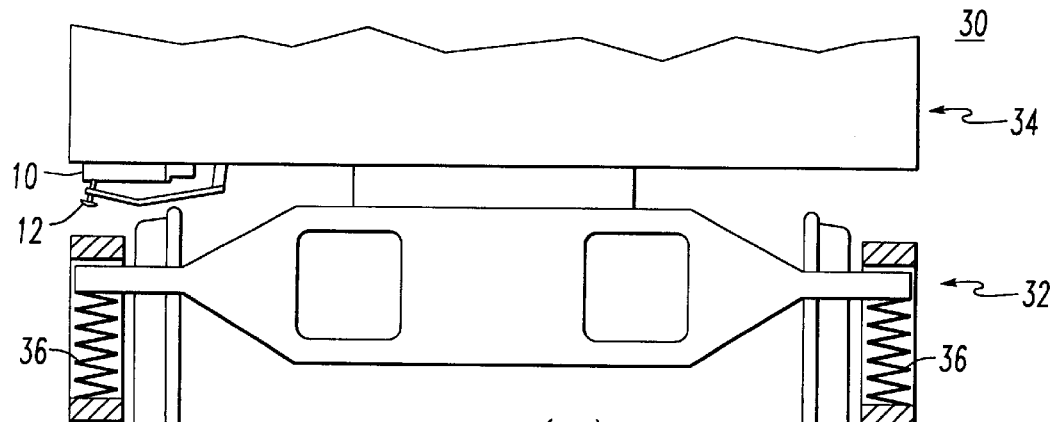
FIG. 4(a) is a diagrammatic end view of a railcar equipped with an SC1/ELX-Type automatic empty/load brake device, illustrating the railcar in an unloaded condition with no braking application.
Figure 4B:
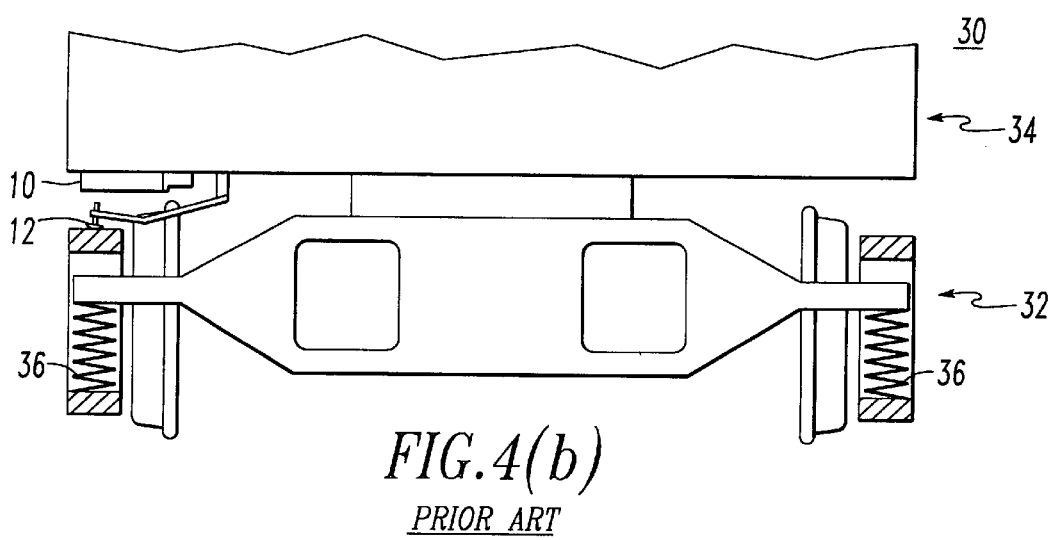
FIG. 4(b) is also a diagrammatic end view of a railcar, similar to FIG. 4(a) illustrating, however, the railcar in a loaded condition and during a braking application.
Figure 4C:
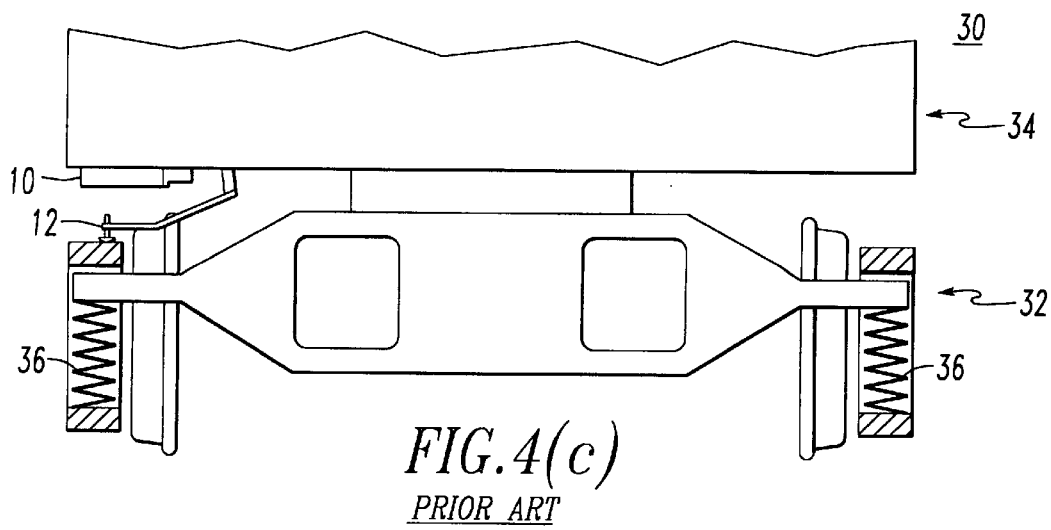
FIG. 4(c) is likewise a diagrammatic end view of a railcar similar to FIGS. 4(a) and 4(b) illustrating, however, the railcar in an empty condition and during a braking application.

Referring now to FIGS. 4(a)–(c), a railcar 30 generally includes a truck 32 and a railcar body 34 that is mounted upon the truck 32 through a resilient suspension 36 (e.g., coil springs). In each illustrated case, the railcar 30 is equipped with an SC1/ELX-Type automatic empty/load brake device 10 mounted on the railcar body 34 and having a sensor arm 12. For comparison purposes, FIG. 4(a) shows the railcar 30 in an empty condition and without any substantial brake application. In FIG. 4(b), the railcar 30 is loaded. Therefore, a brake application has succeeded in moving the sensor arm 12 only a relatively short distance before any further movement on its part is blocked by the truck 32. In contrast, as illustrated in FIG. 4(c), when the railcar 30 is in an unloaded condition, the sensor arm 12 is able to move through a relatively larger displacement before contacting the truck 32.

Figure 5:
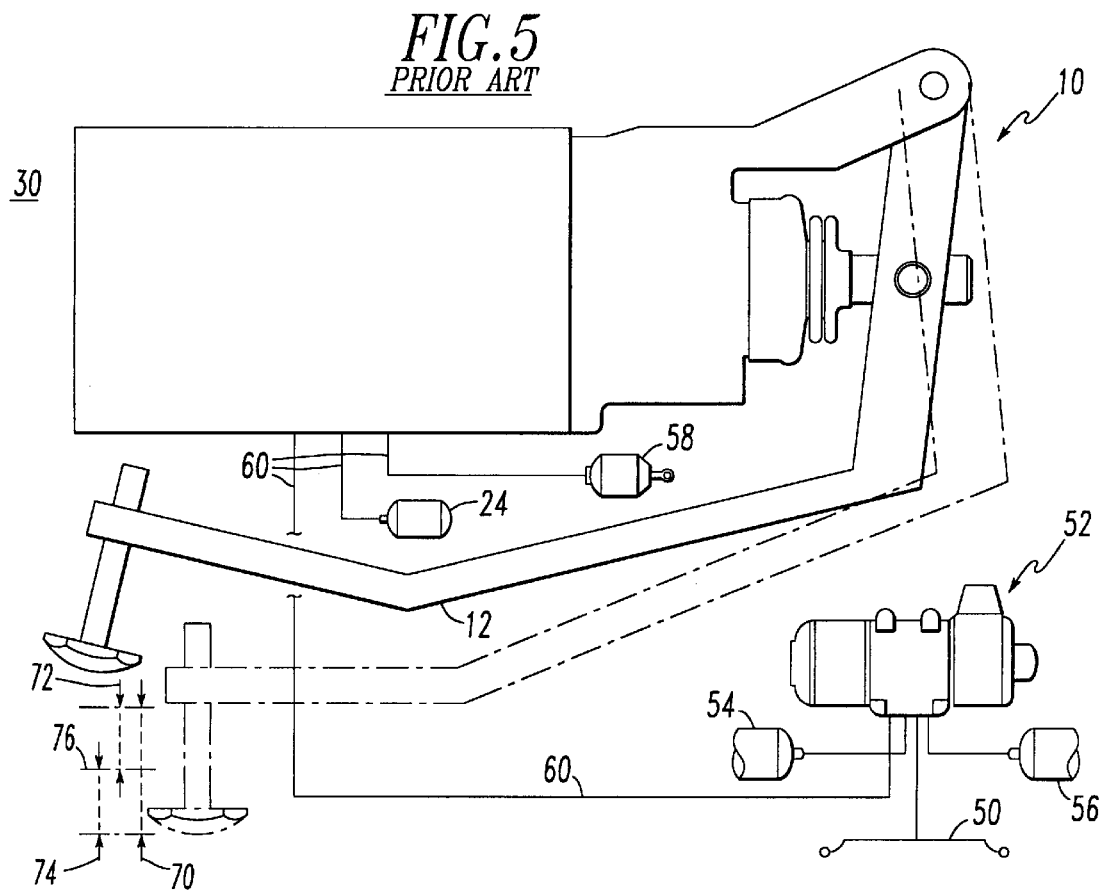
FIG. 5 is a diagrammatic view of a typical railcar braking system employing an SC1/ELX-Type automatic empty/load brake device.

The functioning of an automatic empty/load brake device which the invention is designed to work in conjunction with will now be described with respect to the SC1/ELX-Type unit diagrammatically shown in FIG. 5 and designated by reference numeral 10. More specific examples of such an SC1/ELX-Type unit are the SC-1, ELX-U and ELX-B automatic empty/load brake units that are illustrated in FIGS. 1, 2 and 3, respectively. It should be appreciated, however, that the present invention may be used in conjunction with substantially any automatic empty/load brake device that utilizes a sensor member which extends and retracts in order to determine truck to railcar body clearance and that adjusts brake cylinder pressure appropriately.

As mentioned above, a railway train normally has a brake pipe carrying compressed air, the pressure of which is controlled by the engineer. As shown in FIG. 5, each railcar 30 typically includes a portion of the brake pipe 50, an AB-Type Control Valve 52, auxiliary and emergency compressed air reservoirs 54 and 56, respectively, and brake cylinders 58. When the pressure in the brake pipe 50 is reduced, the AB-Type Control valve 52 functions to raise the pressure in the brake cylinders 58 by supplying compressed air thereto through a line 60 from at least the auxiliary reservoir 54 and possibly the emergency reservoir 56 (dependent upon the severity of the braking). An SC1/ELX-Type automatic empty/load brake device 10 is interposed in the line 60 between the AB-Type Control Valve 52 and the brake cylinders 58 to reduce (or proportion) the pressure supplied when an empty railcar condition is detected by the sensor arm 12.

To this end, the sensor arm 12 is movable through a total range of positions 70 in response to the application of a brake pressure to the brake cylinders 58 of the railcar 30. The total range of possible positions 70 of the sensor arm 12 includes a first range of positions 72, wherein the sensor arm 12 is in a relatively retracted position, relatively closer to the body of the automatic empty/load braking device 10 and a second range of positions 74, wherein the sensor arm 12 is in a relatively extended position, relatively further from the body of the automatic empty/load braking device 10.

The first range of positions 72 and the second range of positions 74 are separated from one another by a transition position 76 which is the position of the sensor arm 12 that defines a changeover point at which the railcar 30 is determined to be empty or loaded. In other words, when the sensor arm 12 is within the first range of positions 72, the automatic empty/load device 10 determines the railcar 30 as being in a loaded condition and supplies the brake cylinders 58 thereof with a full braking pressure as determined by the pressure of the brake pipe 50. When the sensor arm 12 is within the second range of positions 74, the automatic empty/load device 10 determines the railcar 30 as being in an empty condition and reduces the pressure to the brake cylinders 58 by the aforementioned 50–60% (or 40% in the case of the particular ELX unit discussed above).

A manual empty/load shifting apparatus constructed according to the present invention, which is generally designated by reference numeral 80 in FIGS. 3, 6 and 7, includes a manual shifting member 82 which is moveable between a first disposition 84 shown in FIG. 6 and a second disposition 86 shown in FIG. 3. The manual shifting member 82 is disposed (e.g., mounted) adjacent an automatic empty/load brake device 10 (or any similarly functioning automatic empty/load brake device) which is provided with a sensor arm 12. The automatic empty/load brake device 10 is itself mounted on a railcar body 34 of a railcar 30.

The manual shifting member 82 itself generally includes a shaft 88 which is rotatable about a longitudinal axis 90 thereof. A radial protrusion 92 extends radially outward from the shaft 88. As seen most clearly in FIG. 6, the radial protrusion 92 extends toward the automatic empty/load brake device 10 when the manual shifting member 82 is in the first disposition 84 to thereby confine the sensor arm 12 to the first range of positions 72 and to exclude the sensor arm 12 from traveling into the second range of positions 74. On the other hand, when the manual shifting member is in the second disposition 86 shown in FIG. 3, the sensor arm 12 is not confined to the first range of positions 72 by the radial protrusion 92 but is instead able to travel into the second range of positions 74. The radial protrusion 92 is preferably provided in the form of a flange member 94 that extends radially from the shaft 88.

The shaft 88 is supported for rotation about its longitudinal axis 90 in a pair of support bearings 96 disposed at its two distal ends. Each of the support bearings 96 is presently preferred as being in a form of a plate member 98 having an upstanding flange 99 and a tubular length 100 secured thereto (e.g., by welding). The shaft 88 projects through the tubular length 100 and the upstanding flange 99. The upstanding flanges 99 are secured to the railcar body 34. This can be accomplished by various means. For example, in the presently preferred embodiment shown in FIG. 6, a pair of escutcheon plates 102 are provided to connect the upstanding flanges 99 to the railcar body 34. The upstanding flanges 99 are connected to the escutcheon plates 102, e.g., by welding or bolting, and the escutcheon plates 102 are in turn bolted or welded to the railcar body 34.

The shaft 88 is preferably of sufficient length so as to at least completely span the width of the railcar 30 and is fitted with an L-shaped handle 104 on at least one and, preferably, both ends to allow manual rotation of the manual shifting member 82 between the first and second dispositions 84 and 86, respectively. Having an L-shaped handle 104 at each end of the shaft 88 allows the empty/load manual adjustment to be made from either side of the railcar 30. Each L-shaped handle 104 includes a first portion 106 that extends radially to the longitudinal axis 90 and a second portion 108 that extends substantially parallel to the longitudinal axis 90. Each L-shaped handle 104 is secured by a collar 110 that surrounds the shaft 88.

As shown in FIG. 8, a gear transfer reverser mechanism 150 is, preferably, provided between one of the L-shaped handles 104 and the shaft 88. The gear transfer reverser mechanism 150 functions to provide that rotational direction of both of the L-shaped handles 104 between the empty and loaded positions is always constant with respect to the operator of the handle, regardless of which side of the railcar 30 the operator is positioned on. For example, when the operator rotates either one of such L-shaped handles 104 in the clockwise direction, the railcar 30 would always be conditioned for empty braking, while rotating either one of the L-shaped handles 104 in the counterclockwise direction would always condition the railcar 30 for loaded braking. Such consistency of operation, regardless of which side of the railcar 30 the operator is standing, minimizes confusion, particularly during nighttime operation, and improves operating efficiency.

As shown in FIG. 8, in its presently preferred embodiment, the gear transfer reverser mechanism 150 includes a first circular gear member 152 which is connected to one of the L-shaped handles 104 and a second circular gear member 154 which connects to the rotatable shaft 88. The first and second circular gear members 152 and 154, respectively, interlock to provide for a rotational reversal between the empty and loaded positions on one side of the railcar 30.

The flange member 94 may of course be formed integral with the shaft 88. However, as seen in FIGS. 6, 9 and 10, it is presently preferred that the flange member 94 be provided as a portion of a separate actuator 112 which is secured to the shaft 88.

Figure 10:
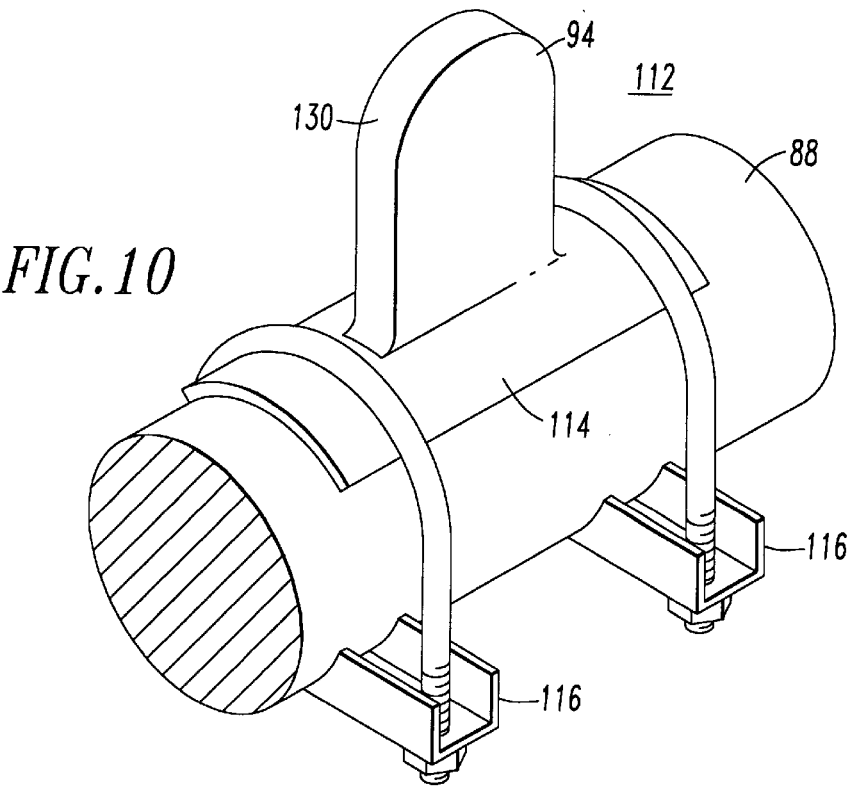
FIG. 10 is a perspective view of a second embodiment of the actuator portion.

FIG. 10 illustrates a first embodiment of the actuator 112 which is non-adjustable and which includes an arcuate portion 114 to which the flange member 94 is connected and extends radially therefrom. The arcuate portion 114 may be fashioned from a section of pipe and the flange member 94 may be permanently affixed, for example, by welding. A pair of clamping mechanisms 116, e.g., automotive exhaust type clamps, straddle the flange member 94 for clamping the actuator 112 to the shaft 88.

Figure 9:
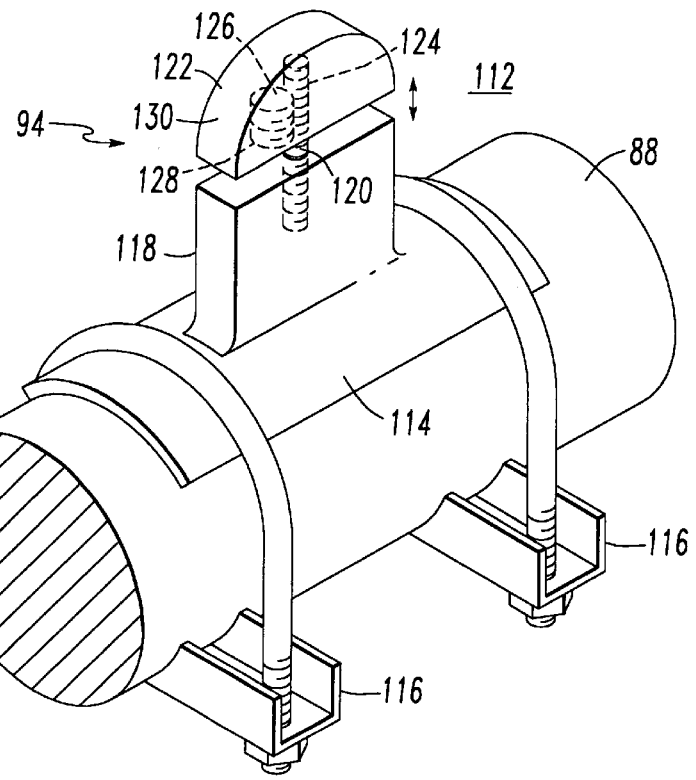
FIG. 9 is a perspective view of a first embodiment of an actuator portion of the inventive manual empty/load shifting apparatus.

FIG. 9 shows a second embodiment of the actuator 112 which is an adjustable version and which includes a semi-arcuate portion 114 and a first flange member 118 permanently affixed thereto and extending radially therefrom. A threaded stud 120 is anchored in the first flange member 118 and extends in a radial direction. A second flange member 122 is provided with a recess 124 for accepting the threaded stud 120. A rotatable worm gear 126 is caged within a second recess 128 provided in the second flange member 122 immediately adjacent the recess 124. The worm gear 126 engages the threads of the threaded stud 120 such that rotation of the worm gear 126 (e.g., through use of a hex key) extends and retracts the second flange member 122 with respect to the shaft 88. Once a proper radial extension has been obtained, the worm gear 126 and/or the threaded stud 120 can be tack welded to the second flange member 122 to retain the desired positioning.

It will be appreciated that an adjustable actuator 112 can be implemented in various other forms than the presently preferred embodiment shown in FIG. 9 and described above. In essence, the radial protrusion 92 and the flange member 94 form an eccentric camming surface 130 which is eccentrically positioned with respect to the longitudinal axis 90 of the shaft 88 and which, upon rotation of the shaft 88 via the handle portions 104, moves closer to the sensor arm 12, thereby confining it to the first range of positions 72 or, if the sensor arm is already disposed within the second range of positions 74, depressing the sensor arm 12 back into the first range of positions 72. It will be apparent to those of ordinary skill in the mechanical arts that a wide range of various mechanisms can be employed to achieve this result.

Additionally, the eccentric camming surface 130 formed by the radial protrusion 92 and the flange member 94 may be preferably positioned on the shaft 88 such that, when the manual empty/load shifting apparatus 80 is in the loaded position shown in FIG. 6, the radial protrusion 92 and flange member 94 are beyond the 12 o'clock dead center position. Such an "over center" camming configuration, together with friction between the sensor arm 12 and the flange member 94 serves to maintain the apparatus in the loaded position once the L-shaped handles 104 have been moved to the loaded position.

When the apparatus has been configured by the operator for empty braking (i.e., L-shaped handles 104 in the empty position), the weight of the flange member 94 prevents any transition to the loaded position of the apparatus. While not however necessary, a positive latching mechanism could be provided to maintain the manual empty/load shifting apparatus 80 in the selected empty and loaded positions. Various positive latching mechanisms which are well known in the mechanical arts may be employed.

For example, such a positive latching mechanism could take the form of a cable running transverse to the width of the railcar 30 such that the cable could be "pulled" from either side of the railcar 30. The cable operates through a pulley type mechanism and is ultimately connected to a spring tensioned rachet type latch. The ratchet type latch is connected to the gear transfer reverser mechanism 150 of FIG. 8 and automatically locks it into place due to spring tension. When the cable is manually pulled, the latch spring compresses and lifts the ratchet from one of the gears of the gear transfer reverser mechanism 150, thereby freeing the L-shaped handles 104 for rotation.

While the present invention has been described by way of particular presently preferred embodiments, various substitutions of equivalents can be affected without departing from the spirit and scope of the invention as set forth in the appended claims.

We claim:

1. A manual shifting apparatus for manually shifting an automatic empty/load brake device, such automatic empty/load brake device being used in conjunction with a pneumatic braking system provided on a transport vehicle, such transport vehicle including a truck and a car body mounted on such truck through a resilient suspension system, such transport vehicle having a substantially loaded condition and a substantially unloaded condition, such automatic empty/load brake device having a sensor arm, such sensor arm being operable to move through a range of positions upon an application of a braking force to such transport vehicle by such pneumatic braking system, such range of positions of such sensor arm including a first range of positions indicating such transport vehicle as being in such substantially loaded condition and a second range of positions indicating such transport vehicle as being in such substantially unloaded condition, such automatic empty/load brake device being effective to apply a substantially reduced pneumatic braking force to such transport vehicle when such sensor arm is in such second range of positions and to apply a substantially unreduced pneumatic braking force to such transport vehicle when such sensor arm is in such first range of positions, said manual shifting apparatus being adapted for mounting on such transport vehicle adjacent such automatic empty/load brake device, said manual shifting apparatus comprising:

a manual shifting member movable between a first disposition and a second disposition, in said first disposition said manual shifting member being operable to confine such sensor arm of such automatic empty/load brake device to such first range of positions and to exclude such sensor arm of such automatic empty/load brake device from travel into such second range of positions and in said second disposition said manual shifting member being operable to permit such sensor arm of such automatic empty/load brake device to travel into such second range of positions.

2. A manual shifting apparatus for use in conjunction with and for manually shifting an automatic empty/load device, according to claim 1, wherein said manual shifting member includes:

a shaft member having a longitudinal axis, said shaft member being rotatable about said longitudinal axis to move said manual shifting member between said first disposition and said second disposition; and a radial protrusion extending radially outward from said shaft member, said radial protrusion extending toward such sensor arm of such automatic empty/load brake device in said first disposition and said radial protrusion extending away from such sensor arm of such automatic empty/load brake device in said second disposition.

3. A manual shifting apparatus for use in conjunction with and for manually shifting an automatic empty/load device, according to claim 2, wherein said radial protrusion includes a flange member extending radially from said shaft member.

4. A manual shifting apparatus for use in conjunction with and for manually shifting an automatic empty/load device, according to claim 3, wherein said manual shifting apparatus additionally includes an actuator member and at least one clamping mechanism clamping said actuator member to said shaft member, said actuator member including an arcuate portion, said flange member extending from said arcuate portion of said actuator member and said arcuate portion of said actuator member at least partially encircling said shaft member.

5. A manual shifting apparatus for use in conjunction with and for manually shifting an automatic empty/load device, according to claim 4, wherein said manual shifting member additionally includes radial adjustment means for adjusting a radial extension of said flange member from said shaft member, said radial adjustment means including a first flange member portion and a second flange member portion, said first and second flange member portions being connected by an extendable connection and said first flange member portion extending outward from said actuator member.

6. A manual shifting apparatus for use in conjunction with and for manually shifting an automatic empty/load device, according to claim 4, wherein said arcuate portion of said actuator member has a contour that substantially matches a contour of a peripheral portion of said shaft member and wherein said at least one clamping mechanism includes two clamping mechanisms, one each of said two clamping mechanisms being disposed on opposite sides of said flange member along said longitudinal axis of said shaft member.

7. A manual shifting apparatus for use in conjunction with and for manually shifting an automatic empty/load device, according to claim 3, wherein said flange member is substantially free from contact with such sensor arm of such automatic empty/load brake device when said manual shifting member is in said second disposition.

8. A manual shifting apparatus for use in conjunction with and for manually shifting an automatic empty/load device, according to claim 3, wherein said manual shifting member additionally includes radial adjustment means for adjusting a radial extension of said flange member from said shaft member.

9. A manual shifting apparatus for use in conjunction with and for manually shifting an automatic empty/load device, according to claim 8, wherein said radial adjustment means includes:

a first flange member portion; and a second flange member portion, said first and second flange member portions being connected by a radially extendable connection.

10. A manual shifting apparatus for use in conjunction with and for manually shifting an automatic empty/load device, according to claim 2, wherein said manual shifting apparatus additionally includes handle means for permitting manual rotation of said shaft member about said longitudinal axis of said shaft member.

11. A manual shifting apparatus for use in conjunction with and for manually shifting an automatic empty/load device, according to claim 10, wherein said handle means includes at least one handle member extending, at least in part, radially to said longitudinal axis of said shaft member.

12. A manual shifting apparatus for use in conjunction with and for manually shifting an automatic empty/load device, according to claim 11, wherein said at least one handle member includes a substantially L-shaped member having a first handle portion extending radially from said longitudinal axis of said shaft member and a second handle portion extending outward from said first handle portion and substantially parallel to said longitudinal axis of said shaft member.

13. A manual shifting apparatus for use in conjunction with and for manually shifting an automatic empty/load device, according to claim 1, wherein said manual shifting apparatus additionally includes at least one support bearing mechanism for rotatably supporting said shaft member.

14. A manual shifting apparatus for use in conjunction with and for manually shifting an automatic empty/load device, according to claim 7, wherein such transport vehicle is a rail transport vehicle having a direction of travel and a width transverse to such direction of travel and wherein a length of said shaft member along said longitudinal axis of said shaft member is substantially at least as great as such width of such rail transport vehicle.

15. A manual shifting apparatus for use in conjunction with and for manually shifting an automatic empty/load device, according to claim 14, wherein said handle means includes:

two handle members, one each of said two handle members being attached to opposite ends of said shaft member, each of said two handle members including a substantially L-shaped member having a first handle portion extending radially from said longitudinal axis of said shaft member and a second handle portion extending outward from said first handle portion and substantially parallel to said longitudinal axis of said shaft member, whereby one each of said two handle members being disposed on opposite sides of such rail transport vehicle when said manual shifting apparatus is mounted on such rail transport vehicle adjacent such automatic empty/load brake device.

16. A manual shifting apparatus for mounting on a wheeled vehicle having a pneumatic braking system for applying a pneumatic braking force to such wheeled vehicle and utilizing an automatic empty/load brake device for determining an empty/loaded condition of such vehicle and for reducing such pneumatic braking force if such vehicle is determined to be empty, such automatic empty/load brake device being for attachment to such vehicle and having a sensor member for determining such empty/loaded condition, such automatic empty/load brake device determining such vehicle to be loaded when such sensor member is in a first range of positions and such automatic empty/load brake device determining such vehicle to be empty when such sensor member is in a second range of positions, such first and second ranges of positions being divided by a transition position, said manual shifting apparatus comprising:

a shaft member rotatable about an axis of rotation between a first disposition and a second disposition; and an eccentric camming surface extending radially from said shaft member, said eccentric camming surface being eccentrically disposed with respect to said axis of rotation, in said first disposition said eccentric camming surface physically protrudes into such second range of positions and at least up to such transition position of such automatic empty/load brake device and in said second disposition said eccentric camming surface is prevented from physically protruding up to such transition position of such automatic empty/load brake device.

17. A manual shifting apparatus, according to claim 16, wherein in said first disposition said eccentric camming surface prevents travel of such sensor member of such automatic empty/load brake device beyond such transition position and into such second range of positions and in said second disposition said eccentric camming surface permits travel of such sensor member of such automatic empty/load brake device beyond such transition position and into such second range of positions.

18. A manual shifting apparatus, according to claim 16, wherein said eccentric camming surface includes a flange member extending radially from said shaft member.

19. A manual shifting apparatus, according to claim 18, said manual shifting apparatus additionally includes:

a) an actuator member separate and non-integral with respect to said shaft member and having an arcuate portion at least partially encircling said shaft member, said flange member extending radially from said actuator member;

b) a clamping mechanism clamping said actuator member to said shaft member;

c) at least one support bearing for rotatably supporting said shaft member; and d) at least one handle member extending, at least in part, radially from said shaft member for permitting manual rotation of said shaft member between said first and second dispositions.

20. A manual shifting apparatus, according to claim 18, wherein said flange member includes a first flange member portion and a second flange member portion, said first flange member portion extending radially from said shaft member and said second flange member portion being connected to said first flange member portion by a radially extendable connection.

* * * * *